United States Patent [19]

Hambright

[11] Patent Number: 5,352,120
[45] Date of Patent: Oct. 4, 1994

[54] PROCESS FOR APPLYING BEADS TO A SUBSTRATE

[76] Inventor: Perry Hambright, 22543 Ventura Blvd., Suite 211, Woodland Hills, Calif. 91364

[21] Appl. No.: 86,504

[22] Filed: Jun. 30, 1993

Related U.S. Application Data

[63] Continuation-in-part of Ser. No. 844,248, Mar. 2, 1992, Pat. No. 5,234,340, which is a continuation-in-part of Ser. No. 564,740, Aug. 6, 1990, Pat. No. 5,096,422.

[51] Int. Cl.$^5$ ............................................. G09B 19/20
[52] U.S. Cl. ......................................... 434/95; 434/96
[58] Field of Search ....................... 434/96, 97, 95, 84, 434/81, 207, 208, 99; 206/574, 575; 26/69 R; 112/104, 265.1, 88

[56] References Cited

U.S. PATENT DOCUMENTS

| | | |
|---|---|---|
| 532,110 | 1/1895 | Stockmann . |
| 819,877 | 5/1906 | Gilman . |
| 1,441,557 | 1/1923 | Bretschneider ........................ 112/88 |
| 1,889,976 | 12/1932 | Comins ................... 434/96 |
| 2,588,321 | 5/1950 | Hahn . |
| 2,864,178 | 12/1958 | Marguez . |
| 2,954,615 | 10/1960 | Brown . |
| 4,310,313 | 1/1982 | Brundige . |
| 4,489,111 | 12/1984 | Woodrum ....................... 206/575 X |
| 4,530,665 | 7/1985 | Colonel . |
| 4,657,800 | 4/1987 | Long ................... 434/95 X |
| 4,912,850 | 4/1990 | Gray . |
| 5,096,422 | 3/1992 | Hambright . |
| 5,141,438 | 8/1992 | Spector . |
| 5,234,340 | 8/1993 | Hambright . |

FOREIGN PATENT DOCUMENTS 0731358 6/1955 United Kingdom .................. 434/95

Primary Examiner—Richard J. Apley
Assistant Examiner—Karen A. Jalbert
Attorney, Agent, or Firm—Kelly, Bauersfeld & Lowry

[57] ABSTRACT

Decorative beads are applied to a selected substrate, such as an article of clothing, in a pre-determined arrangement, utilizing a rod-like skewer and a folding chart or guide having a mirror image of the predetermined pattern printed thereon. The process for applying the decorative beads involves the steps of first placing the clothing article over a flat rigid surface such as a painting board and flattening the clothing fabric without unduly stretching it. The chart is placed over the clothing article so that the mirror image pattern is placed directly over the location where the beads are to be applied. The chart is folded back to expose a row of the pattern indicia, and beads corresponding to the pattern indicia are placed onto the skewer. Glue is applied to the clothing article adjacent to the row of pattern indicia, and then the row of beads on the skewer are brought into contact with the glue and aligned with the chart. As the beads are held in place on the clothing article, the skewer is removed from the row of beads. This process is repeated for each row of pattern indicia provided by the chart.

23 Claims, 2 Drawing Sheets

PROCESS FOR APPLYING BEADS TO A SUBSTRATE

RELATED APPLICATIONS

This is a continuation-in-part of U.S. patent application Ser. No. 07/844,248, filed Mar. 2, 1992 now U.S. Pat. No. 5,234,340, and entitled HANDICRAFT GUIDE, which is a continuation-in-part of U.S. patent application Ser. No. 07/564,740, filed Aug. 6, 1990, now U.S. Pat. No. 5,096,422.

BACKGROUND OF THE INVENTION

This invention relates generally to handicrafts. More particularly, the present invention relates to a novel process for applying decorative beads to a flexible substrate, such as an article of clothing, in a desired arrangement.

The utilizing of handicrafts in conjunction with fabrics has long been known. Besides quilting, there is needlepoint, cross-stitching and other handicrafts that are based on incorporating yarn of different colors in the form of stitches on fabric. These stitches are to be arranged on the fabric in a specific arrangement forming a desired "picture".

Another way in which a desired "picture" could be achieved on fabric is by utilizing sequins in the form of small flat circular disks which are made in a wide variety of colors. Sequins can be placed on the fabric to form a particular design. The different colors can be utilized to denote certain features within that design. For example, a common design would be a domestic animal such as a dog, cat or bird. Similarly, a "picture" could be achieved on fabric by utilizing decorative beads which are either sewn or adhered to the fabric to form a particular design.

The placing of a handicraft on fabric in a desired location generally has been accomplished by two methods. The first method is to have the design reproduced as a chart on graph paper with symbols being utilized to represent different colors. The crafter can duplicate that design onto the fabric by counting from the chart and reproducing the design by utilizing of the same count on the fabric.

The second method, sometimes referred to as the "no count" method, simply has the original design painted or printed directly onto the fabric. All the crafter has to do is cover the printed color (or color designated area) with the appropriate matching color of craft material. This method is far faster and easier than counting, but it cannot be used in many instances. If, for example, the fabric is black, the printing or painting might be very difficult to observe. Another reason for not utilizing the "no count" method is that only preprinted fabric may be used, which excludes the majority of fabric choices.

Decorative beads have proven to be especially troublesome to crafters because, when handled separately, they are difficult to precisely align in accordance with a predetermined pattern to create an aesthetically pleasing design. When the beads are glued to an underlying substrate, such as an article of clothing, they tend to roll one way or another, making it very difficult to attain a precise alignment of the beads.

Accordingly, there has been a need for a novel handicraft process which assists crafters in reproducing designs on flexible substrates such as articles of clothing, utilizing decorative beads. The process should be easy to implement, be adaptable for use in connection with any color of fabric or underlying surface which, utilizing traditional methods, would not easily facilitate the preprinting of patterns thereon, and work well with preprinted handicraft guides such as that disclosed in U.S. Pat. No. 5,096,422. Moreover, a novel process for applying decorative beads to an article of clothing in a predetermined pattern is needed which ensures precise alignment of the beads in accordance with indicia provided on the pattern, and which helps to ensure that the beads remain in such precise alignment until firmly affixed to the clothing article. The present invention fulfills these needs and provides other related advantages.

SUMMARY OF THE INVENTION

The present invention resides in an improved process for applying beads to a substrate in a pre-determined arrangement, which may be advantageously utilized in connection with handicraft guides that are detachable from the substrate and which accurately determines the proper placement of the beads. The process comprises, generally, the steps of providing a pattern of indicia for placement of the beads on the substrate, and placing a row of beads onto a rod in a manner corresponding to a row of the indicia pattern. The row of beads on the rod are then adhered to the substrate adjacent to the row of the indicia pattern, and the rod is then removed from the row of beads.

In a preferred form of the invention, the process is utilized to apply beads to an article of clothing in a pre-determined arrangement. In this instance, the article of clothing is first placed over a rigid surface such that an area of the clothing article to which the beads will be applied is supported by the rigid surface. The clothing article is preferably laid flat with only incidental stretching.

A pattern of indicia for the placement of beads on the clothing article includes a detachable guide placed over a portion of the clothing article. Inscribed onto the guide are a plurality of indicia corresponding to the placement and color of the beads to be applied to the clothing article. The indicia are arranged in a mirror image arrangement of the pattern to be produced on the clothing article. The guide is placed onto the clothing article such that the indicia are located directly against the clothing article and not exposed, and a portion of the guide is folded back to expose a first row of the indicia pattern.

A row of beads corresponding to a row of the pattern indicia is loaded onto the rod. A line of glue is applied to the clothing article adjacent to the exposed row of the indicia pattern. The row of beads on the rod are placed into contact with the glue for purposes of adhering the row of beads to the clothing article. The rod is removed from the row of beads by immobilizing the bead closest to a handle forming first end of the rod, and pulling the rod away from the beads in the direction of the first end.

Means are provided for automatically preventing the row of beads from slipping off a second end of the rod prior to the step of removing the rod from the row of beads. This can be accomplished by placing a dab of glue or flock bristles on the second end of the rod, or by simply flattening it out to enlarge the second end of the rod such that the beads are closely frictionally engaged thereby as they slide onto or off of the rod over the second end.

After a first row of the beads has been adhered to the clothing article, a further portion of the guide is folded back to expose a second row of the indicia pattern. A second row of beads is then placed on the rod corresponding to the second row of the indicia pattern, and fixed to the clothing article adjacent to the second row of the indicia pattern. The steps of folding back the guide, placing a row of beads on the rod and fixing the row of beads to the clothing article is repeated until the beads have been applied to the clothing article in accordance with the predetermined arrangement.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DESCRIPTION OF THE PREFERRED EMBODIMENT

Figure 1:
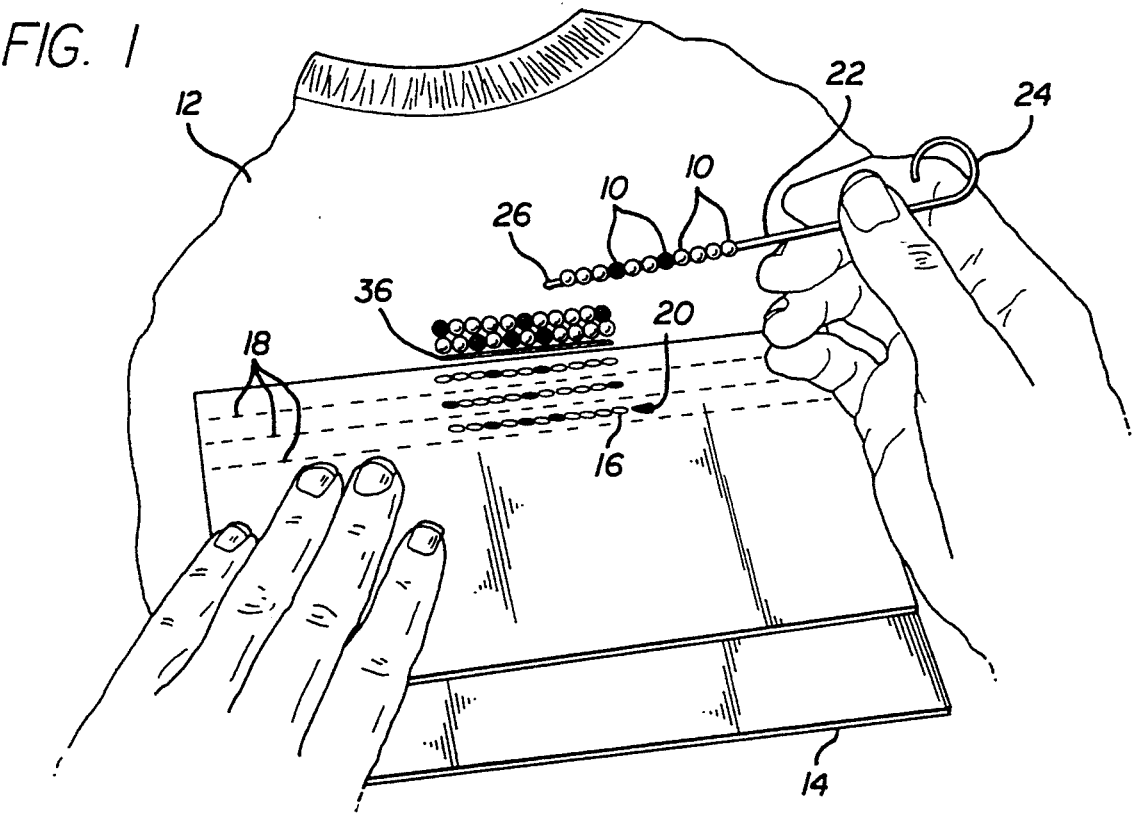
FIG. 1 illustrates the use of a handicraft guide or chart which provides a pattern of indicia for the placement of beads onto an article of clothing, and how corresponding rows of beads are placed on a skewer and aligned with the rows of the indicia pattern to create a pre-determined arrangement of beads on the article of clothing.

As shown in the drawings for purposes of illustration, the present invention is concerned with a process for applying beads to a substrate in a pre-determined arrangement, wherein the beads are generally designated by the reference number 10. The process of the present invention may be advantageously utilized in connection with the handicraft guide shown and described in U.S. Pat. No. 5,096,422 (the contents of which are incorporated herein) to quickly and accurately adhere a row of the beads 10 to an article of clothing 12.

Before utilizing the process of the present invention to adhere the beads 10 to the clothing article 12, the garment should be washed which, in effect, removes any sizing from the fabric. The clean, dry clothing article 12 should then be placed over a painting board or other rigid surface which provides a hard, flat work area and prevents glue from soaking through the clothing article. Care should be taken not to stretch the fabric of the clothing article 12, but only to flatten it. Overstretching of the fabric will cause the finished design to curl.

In accordance with the present invention, a handicraft guide 14 is utilized to indicate the proper placement of the beads 10 on the clothing article 12. The handicraft guide 14 illustrated in the drawings is similar to the guide shown in U.S. Pat. No. 5,096,422, and includes an outline of a pre-determined pattern on the upwardly-facing surface of the guide. This outline is used in placing the guide 14 over a selected area of the clothing article 12. When properly positioned, the guide 14 is taped to the clothing article 12.

The undersurface of the handicraft guide 14 has printed thereon a mirror image of the pre-determined pattern, with indicia 16 specifying the placement and color of each bead 10 to be applied to the clothing article 12 to reproduce the pre-determined pattern on the clothing article. The handicraft guide 14 is also provided with generally equidistantly spaced perforated lines 18 which separate adjacent rows of the indicia pattern 16. After the guide 14 has been attached to the clothing article 12, the guide is folded back one row at a time from the top until a first row 20 of the indicia pattern 16 appears. The indicia pattern 16 comprises colored circles which correspond generally to the circumference of the beads 10, and indicate proper placement of the colored beads onto the clothing article 12.

Figure 2:
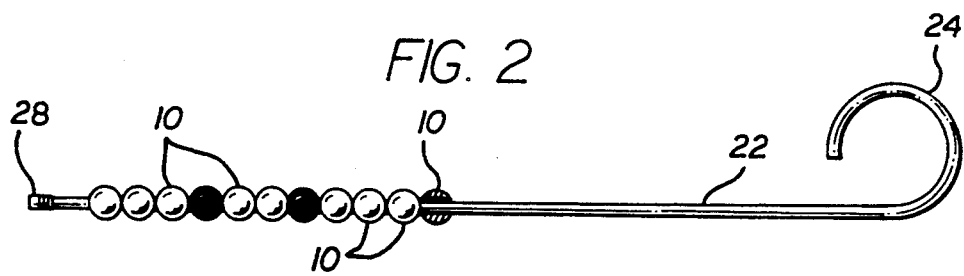
FIG. 2 is an enlarged elevational view of the skewer illustrated in FIG. 1, having a row of beads placed thereon, wherein a dab of glue has been placed onto an end of a shaft of the skewer to prevent the beads from sliding off unintentionally.
Figure 3:
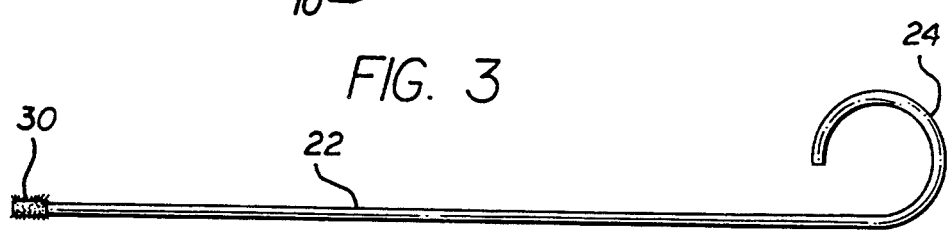
FIG. 3 is an elevational view similar to that shown in FIG. 2, illustrating an alternative skewer design wherein flock bristles have been adhered to the end of the shaft to prevent the beads from accidentally falling off of the skewer.
Figure 4:
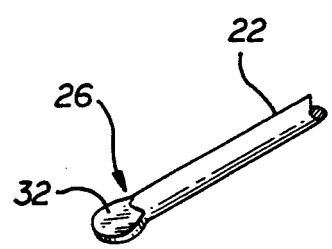
FIG. 4 is an enlarged, fragmented perspective view of yet another alternative design for the end of the shaft, which has been enlarged to automatically prevent the beads from accidentally sliding off of the skewer during the process of the present invention.

A rod-like skewer 22 is provided for aligning the beads in accordance with an exposed row of the pattern indicia 16, and accurately placing that row of beads onto the clothing article 12 adjacent to a folded edge of the handicraft guide 14. The skewer 22 includes a handle forming first end 24, and a second end 26. The handle 24 loops away from the longitudinal axis of the skewer 22 to facilitate handling thereof when placed adjacent to the clothing article 12 (see FIG. 8). The second end 26 of the skewer 22 may include means for automatically preventing the row of beads from slipping off the second end of the skewer unintentionally. In this regard, a dab of glue 28 (FIG. 2), or a segment of flock bristles 30 (FIG. 3) may be adhered to the second end 26 of the skewer 22. Alternatively, the second end 26 may be simply flattened to create an enlarged section 32 (FIG. 4). In each case the intended purpose is accomplished when the second end 26 of the skewer 22 closely frictionally engages the beads 10 as they slide onto or off of the skewer over the second end.

Figure 5:
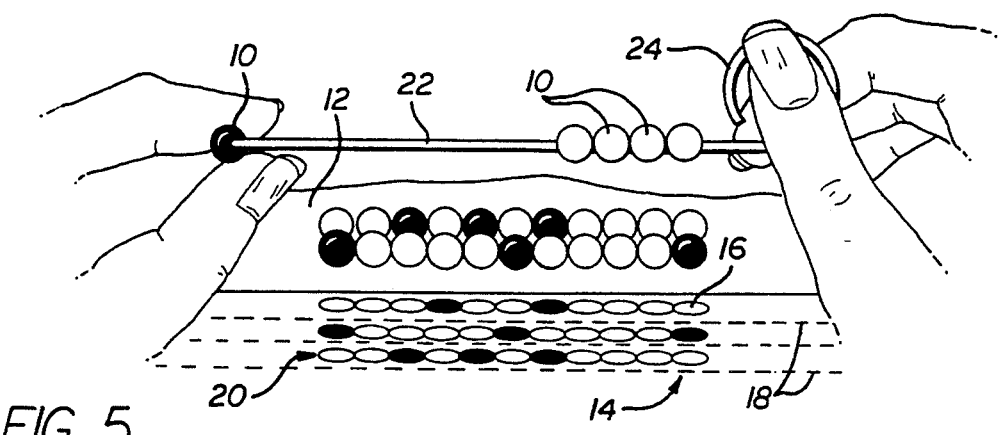
FIG. 5 illustrates the step of sliding a row of beads onto the skewer in a manner corresponding to a row of the indicia pattern provided on the handicraft guide.

With reference to FIG. 5, the beads 10 are loaded onto the skewer 22 so that the row of beads loaded thereon matches a first exposed row 20 of the indicia pattern 16 on the handicraft guide 14. It is suggested that if the crafter is right-handed, the first bead 10 loaded should match the first indicia 16 on the right side of the row 20. For left-handers the first bead 10 should match the first indicia 16 on the left side of the row. Once the entire row of beads 10 has been loaded onto the skewer 22, the loaded skewer is laid adjacent to the fold line of the handicraft guide 14 to double check the row of beads against the indicia pattern 16 before gluing.

Figure 6:
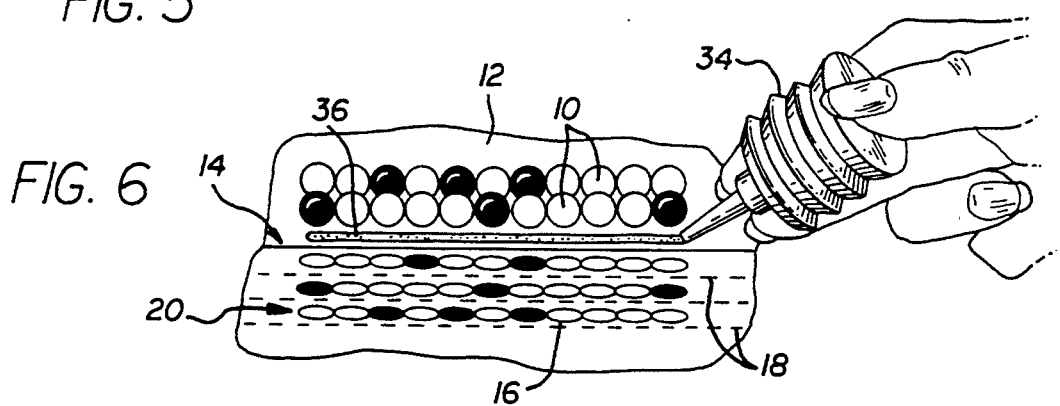
FIG. 6 illustrates the step of applying a line of glue to the clothing article adjacent to the row of the indicia pattern.
Figure 7:
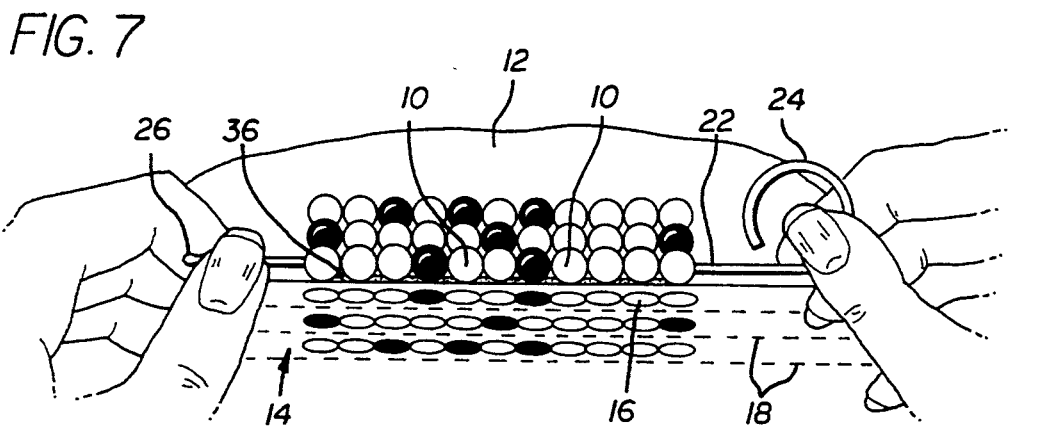
FIG. 7 illustrates the step of utilizing the skewer to place the supported row of beads into contact with the adhesive and in alignment with the row of the indicia pattern.

With reference to FIG. 6, the loaded skewer 22 is placed aside, and utilizing a glue bottle 34, a line of glue 36 is squeezed onto the clothing article 12 so that it is about 0.25 inch above the first row 20 of the indicia pattern 16, and so that the line of glue is exactly the same length as the row of the indicia pattern. The thickness of the glue line 36 should be about that of a spaghetti noodle. The tightly packed row of beads 10 previously placed onto the skewer 22 is then brought into contact with the wet glue 36 in alignment with the indicia pattern 16 (See FIG. 7).

Figure 8:
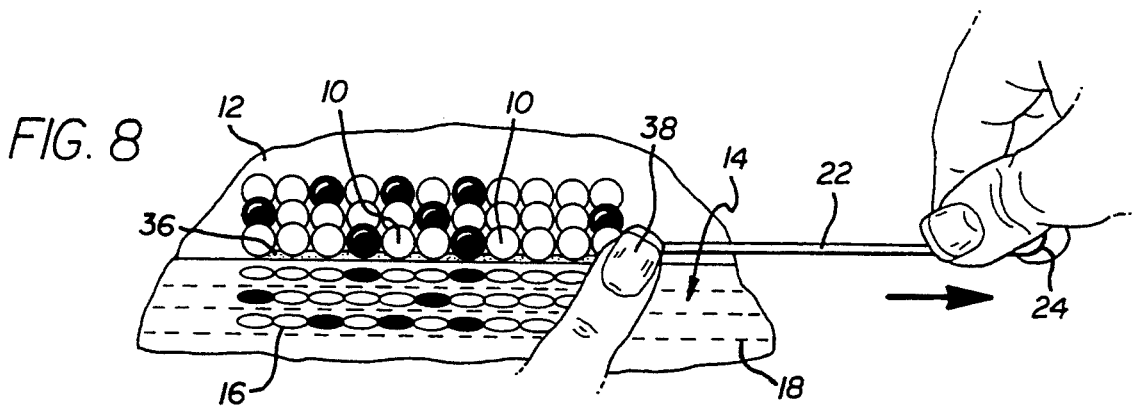
FIG. 8 illustrates the step of securely holding the row of beads adjacent to the article of clothing while pulling on the skewer to remove it from the beads while leaving them in place on the article of clothing.

To remove the skewer 22 from the beads 10 placed into the line of glue 36 over the clothing article 12, the index finger 38 of the free hand is placed onto the bead 10 closest to the handle 24 (FIG. 8). The handle 24 is slowly pulled away from the beads 10 along a line parallel to the indicia pattern 16. After the skewer 22 has been removed, the index finger 38 may be removed from the end bead.

After the first row of beads 10 has been adhered to the clothing article 12, the handicraft guide 14 is folded back once again to reveal the next row of the indicia pattern 16. The process of folding back the guide 14, placing a row of beads 10 on the skewer 22 and adhering the row of beads to the clothing article 12 is repeated until the beads 10 are properly placed to completely recreate the pre-determined pattern or arrangement. Before the beads 10 are placed onto the skewer 22, the skewer should be wiped clean of any excess glue to ensure that the beads do not stick to it.

From the foregoing it is to be appreciated that the process of the present invention provides a far more efficient and organized manner for gluing beads to a selected substrate, such as an article of clothing, to recreate a pre-determined pattern or arrangement. Use of the skewer helps to ensure that the beads 10 placed onto the clothing article 12 precisely match the indicia pattern 16 provided by the handicraft guide 14.

Although a particular embodiment of the invention has been described in detail for purposes of illustration, various modifications may be made without departing from the spirit and scope of the invention. Accordingly, the invention is not to be limited, except as by the appended claims.

I claim:

1. A process for applying beads to a substrate in a pre-determined arrangement, the steps comprising:
   providing a pattern of indicia for placement of the beads on the substrate;
   sliding a row of beads onto a rod, corresponding to a row of the indicia pattern;
   placing the row of beads on the rod adjacent to the row of the indicia pattern;
   removing the rod from the row of beads; and
   adhering the row of beads to the substrate adjacent to the row of the indicia pattern.

2. A process as set forth in claim 1, wherein the rod includes a handle forming first end, and a second end, and wherein the step of sliding the row of beads onto the rod includes the step of inserting the second end into the beads.

3. A process as set forth in claim 2, including the step of automatically preventing the row of beads from slipping off the second end of the rod prior to the step of removing the rod from the row of beads.

4. A process as set forth in claim 3, wherein the step of automatically preventing the beads from slipping off includes the step of enlarging the second end of the rod such that the beads are closely frictionally engaged by the second end of the rod as they slide onto or off of the rod over the second end.

5. A process as set forth in claim 1, wherein the adhering step includes the step of applying a line of glue onto the substrate adjacent to the row of the indicia pattern, and placing the row of beads onto the line of glue utilizing the rod.

6. A process as set forth in claim 1, including the step of immobilizing the row of beads adjacent to the substrate when removing the rod from the row of beads.

7. A process as set forth in claim 1, wherein the step of removing the rod from the row of beads includes the steps of holding one of the beads and sliding the rod out from the row of beads in the direction of the bead being held.

8. A process as set forth in claim 1, wherein the step of providing a pattern of indicia includes the step of utilizing a guide which is detachable from the substrate.

9. A process as set forth in claim 8, including the step of inscribing onto the guide a plurality of indicia corresponding to the placement and color of the beads to be applied to the substrate, the indicia being arranged in a mirror image arrangement of the pattern to be produced on the substrate.

10. A process as set forth in claim 9, wherein the step of utilizing a guide includes the steps of placing the guide onto the substrate such that the indicia are located directly against the substrate and not exposed, folding back a portion of the guide to expose a first row of said indicia, adhering the row of beads on the rod adjacent to the exposed first row of the indicia pattern, folding back a further portion of the guide to expose a second row of the indicia pattern, placing and fixing a second row of beads placed on the rod and corresponding to the second row of the indicia pattern, adjacent to the second row of the indicia pattern, and proceeding with repeating the folding back and placing and fixing steps until the beads have been applied to the substrate in accordance with the predetermined pattern.

11. A process for applying beads to an article of clothing, the steps comprising:
   sliding a row of beads onto a rod;
   automatically preventing the row of beads from unintentionally slipping off the rod;
   applying an adhesive to the article of clothing;
   placing the row of beads on the rod into contact with the adhesive; and
   removing the rod from the row of beads.

12. A process as set forth in claim 11, including the step of providing a pattern of indicia for the placement of the beads on the article of clothing, wherein the indicia pattern includes a detachable guide placed over a portion of the article of clothing.

13. A process as set forth in claim 12, including the steps of sliding a row of beads onto the rod, corresponding to a row of the indicia pattern, applying an adhesive adjacent to the row of the indicia pattern, and placing the row of beads on the rod into contact with the adhesive and in alignment with the row of the indicia pattern.

14. A process as set forth in claim 13, including the step of inscribing onto the guide a plurality of indicia corresponding to the placement and color of the beads to be applied to the clothing article, the indicia being arranged in a mirror image arrangement of the pattern to be produced on the clothing article.

15. A process as set forth in claim 14, wherein the step of utilizing a guide includes the steps of placing the guide onto the clothing article such that the indicia are located directly against the clothing article and not exposed, folding back a portion of the guide to expose a first row of said indicia, adhering the row of beads on the rod adjacent to the exposed first row of the indicia pattern, folding back a further portion of the guide to expose a second row of the indicia pattern, placing and fixing a second row of beads placed on the rod and corresponding to the second row of the indicia pattern, adjacent to the second row of the indicia pattern, and proceeding with repeating the folding back and placing and fixing steps until the beads have been applied to the clothing article in accordance with the predetermined pattern.

16. A process as set forth in claim 11, wherein the rod includes a handle forming first end, and a second end, wherein the step of sliding the row of beads onto the rod includes the step of inserting the second end into the beads.

17. A process as set forth in claim 16, wherein the step of automatically preventing the beads from slipping off includes the step of enlarging the second end of the rod such that the beads are closely frictionally engaged by the second end of the rod as they slide onto or off of the rod over the second end.

18. A process as set forth in claim 17, including the step of immobilizing the row of beads adjacent to the clothing article when removing the rod from the row of beads, by holding one of the beads and sliding the rod out from the row of beads in the direction of the bead being held.

19. A process as set forth in claim 11, including the step of placing the article of clothing over a rigid surface prior to the step of applying the adhesive.

20. A process for applying beads to an article of clothing in a pre-determined pattern, the steps comprising:
   placing the article of clothing over a rigid surface such that an area of the clothing article to which the beads will be applied is supported by the rigid surface, wherein the clothing article is laid flat with only incidental stretching;
   providing a pattern of indicia for the placement of the beads on the clothing article, wherein the indicia pattern includes a detachable guide placed over a portion of the clothing article;
   inscribing onto the guide a plurality of indicia corresponding to the placement and color of the beads to be applied to the clothing article, the indicia being arranged in a mirror image arrangement of the pattern to be produced on the clothing article;
   placing the guide onto the clothing article such that the indicia are located directly against the clothing article and not exposed, and folding back a portion of the guide to expose a first row of said indicia;
   sliding a row of beads onto a rod, corresponding to a row of the indicia pattern, wherein the rod includes a handle forming first end, and a second end, and wherein the step of sliding the row of beads onto the rod includes the step of inserting the second end into the beads;
   adhering the row of beads to the clothing article, wherein the adhering step includes the step of applying a line of glue onto the clothing article and adjacent to the row of the indicia pattern;
   immobilizing the row of beads adjacent to the clothing article and removing the rod from the row of beads;
   automatically preventing the row of beads from slipping off the second end of the rod prior to the step of removing the rod from the row of beads; and
   folding back a further portion of the guide to expose a second row of the indicia pattern, placing and fixing a second row of beads placed on the rod and corresponding to the second row of the indicia pattern, adjacent to the second row of the indicia pattern, and proceeding with repeating the folding back and placing and fixing steps until the beads have been applied to the clothing article in accordance with the predetermined pattern.

21. A process as set forth in claim 20, wherein the step of automatically preventing the beads from slipping off includes the step of enlarging the second end of the rod such that the beads are closely frictionally engaged by the second end as they slide onto or off of the rod over the second end.

22. A process for applying beads to a substrate in a pre-determined arrangement, the steps comprising:
   utilizing a guide which is detachable from the substrate to provide a pattern of indicia for placement of the beads on the substrate;
   inscribing onto the guide a plurality of indicia corresponding to the placement and color of the beads to be applied to the substrate, the indicia being arranged in a mirror image arrangement of the pattern to be produced on the substrate;
   sliding a row of beads onto a rod, corresponding to a row of the indicia pattern;
   placing the row of beads on the rod adjacent to the row of the indicia pattern; and
   removing the rod from the row of beads.

23. A process as set forth in claim 22, wherein the step of utilizing a guide includes the steps of placing the guide onto the substrate such that the indicia are located directly against the substrate and not exposed, folding back a portion of the guide to expose a first row of said indicia, adhering the row of beads on the rod adjacent to the exposed first row of the indicia pattern, folding back a further portion of the guide to expose a second row of the indicia pattern, placing and fixing a second row of beads placed on the rod and corresponding to the second row of the indicia pattern, adjacent to the second row of the indicia pattern, and proceeding with repeating the folding back and placing and fixing steps until the beads have been applied to the substrate in accordance with the predetermined pattern.

* * * * *